April 2, 1957

P. SPENCE 2,787,285

REGULATING-VALVE MEANS

Filed March 7, 1952

PAULSEN SPENCE

Mitchell & Bechert

Attorneys.

United States Patent Office 2,787,285
Patented Apr. 2, 1957

2,787,285

REGULATING-VALVE MEANS

Paulsen Spence, Baton Rouge, La.

Application March 7, 1952, Serial No. 275,275

6 Claims. (Cl. 137—486)

My invention relates to pressure-regulating systems and, in particular, to those which must supply relatively large quantities of pressure fluid to a remote load.

In heating systems for large buildings or for other substantial steam loads, difficulty is often encountered in bringing the system from zero to full load. In an apartment or office building, for example, the heating plant may be shut down during the night hours; but, when the steam is first supplied to the system in the morning, the main regulating valve and all auxiliary regulating valves will demand the utmost flow of steam until the entire system has been supplied. This demand may occasion undesirable transients before the regulating system reaches equilibrium or some satisfactory operating point. These transients may be the cause of banging or other noise throughout the supply system, and undue mechanical wear and damage may also result.

It is, accordingly, an object of the invention to provide an improved pressure-regulating system of the character indicated.

It is another object to provide an improved pressure-regulating system wherein steam may be safely supplied to a large load without encountering undue transients.

It is also an object to provide an improved pressure-regulating system in which the normal regulating point may be advanced in stepped increments, so as to permit the subsidence of relatively small transients for each increment before advancing to the next increment of regulated pressure.

It is a further object to provide an improved pressure-regulating system wherein the regulating point is automatically controlled in accordance with a given change in a detected physical quantity, as sensed at the load supplied by the said regulating means.

It is a specific object to provide a pressure-regulating means meeting the above objects and incorporating a timing mechanism assuring the lapse of a pre-selected time between incremental changes in the regulating point of the system.

Another specific object is to provide an improved pressure-regulating system wherein the rate of flow of pressure fluid governed by the regulating means may determine the regulating point thereof.

Figure 1:
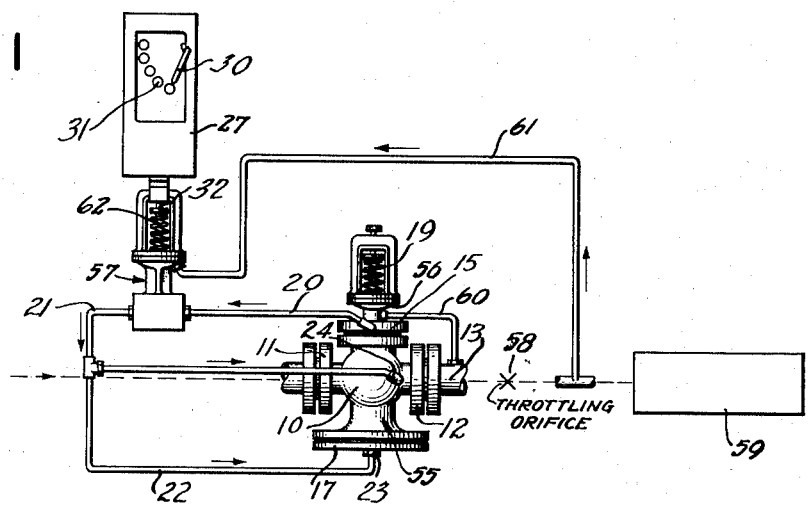
Figure 2:
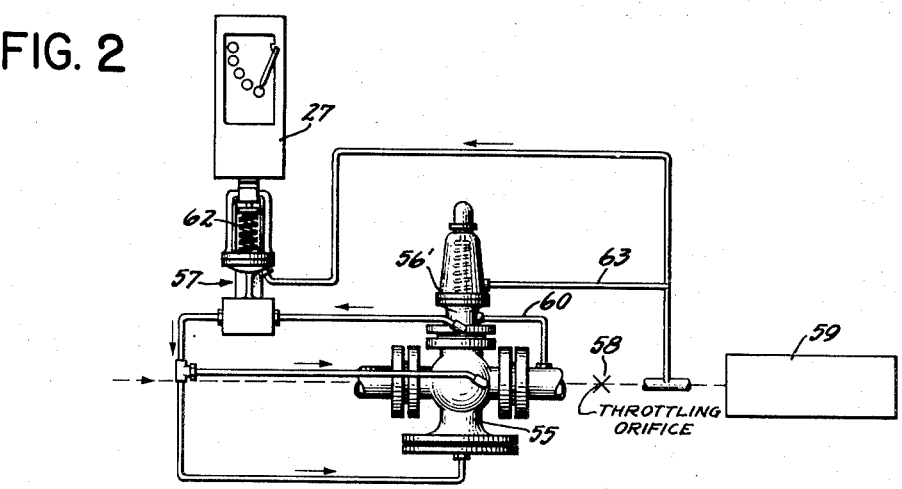

Other objects and various further features of the invention will be pointed out or will occur to those skilled in the art from a reading of the following specification, in conjunction with the accompanying drawings, which show, for illustrative purposes only, preferred forms of the invention:

Fig. 1 is a diagram schematically illustrating important elements of a regulating system incorporating features of the invention; and Fig. 2 is a similar diagram illustrating another embodiment.

Briefly stated, my invention contemplates an improved pressure-regulating system including a main valve and regulating means for said main valve. The regulating means may include pressure-operated pilot-valve means, and I provide automatic preloading means for biasing the operating point of the regulating means in a sequence of biasing increments. The pressure-responsive actuating means for the pilot valve may include a control-pressure connection downstream from the main valve. In one general form of the invention, the automatic preloading means includes means for stepping the bias on the pilot valve in given biasing increments at predetermined timing intervals. If desired, a flow-rate governor may be incorporated in the system to assure that the regulating system will not supply pressure fluid at more than a given rate of flow.

Referring to Fig. 1 of the drawings, my invention is shown in application to a main valve 55 having a body 10 with an inlet connection 11 and an outlet connection 12. The outlet may be connected to a conduit 13 for supplying pressure fluid downstream as to a remote load 59. The main valve structure shown incorporates pressure-responsive pilot means 56 integral with the bonnet 15 thereof. Such structure is shown and described in greater detail in my copending Patent 2,639,556, issued May 26, 1953, reference to which may be had for a more complete structural description. As shown more clearly in said patent, the main valve 55 includes a disc (not shown) for passing pressure fluid from the inlet 11 downstream to conduit 13. Pressure-responsive actuating means for such disc may include a flexible diaphragm, also not shown, but contained beneath a hood 17. Internal spring means normally urge the valve disc to closed position.

The pilot valve 56 may include a pilot valve disc (not shown) normally urged by compression spring 19 to an open position so as to pass high pressure fluid (from upstream of the main valve disc) past the pilot member within valve 56 and via pipe connections 20—21—22 to the active face of the diaphragm (beneath hood 17). The connection 23 between pipe 22 and the space over the diaphragm beneath hood 17 may include a bleed, and bleed means 24 are also preferably provided between one of the connections 21—22 and the downstream or outlet side of the main valve. Control of the regulating point for the described arrangement may be effected by pressure developed in line 60, working over the diaphragm of the pilot 56 and in opposition to the biasing force of spring 19.

In accordance with a feature of the invention as represented in the organization of Fig. 1, the regulating point for the main valve 55 is determined jointly by the pressure pilot 56 and by a second pressure pilot 57, both said pilots 56—57 being connected in series-controlling relation with the diaphragm of the main valve, and deriving their sensing pressures across a throttling means 58. The throttling means 58 may be provided between main valve 55 and the load 59. Thus, the pressure-responsive actuating means of one pilot valve (56) may be connected by line 60 to a point intermediate the main valve 55 and the throttling means, and the other pressure pilot (57) may be similarly connected by line 61 to the downstream side of the throttling means.

In accordance with a further feature of the invention, the regulating point of valve 55 is not only governed by the flow rate across throttling means 58, but in addition, means 27 are provided for changing the bias of spring 62 for pilot 57 in automatically controlled increments. The means 27 may be a so-called motor positioner for variously preloading or biasing the spring 62. It includes a motor or timing means (not shown) for timing intervals at which an actuating stem 32 may be driven downwardly and in incrementally greater biasing relation with the spring 62. The motor positioner shown has five positions and therefore adjusts the load on the biasing means 62 in corresponding incremental steps, as indicated by an external arm 30, which may swing with each step to indicate the point at which the system is operating at any given time.

In operation, a heating system equipped with the device described will, when cold, have the relation of parts shown. When steam under high pressure is first delivered to the main valve at inlet 11, the motor of positioner 27 must be started. High pressure steam will be admitted past the valve members of both pilots 56—57 to the diaphragm of the main valve so as to open the main valve. The initial setting of the motor positioner 27 will produce a relatively light biasing load at 62 so that the main valve will be regulated about a relatively low pressure point by means of the downstream control pressure pickup at 60. Further, it will be seen that the first pilot 56 may serve the function of limiting development of transiently high pressures between the main valve 55 and throttling orifice 58, while the second pilot valve 57 may serve the function of ultimately regulating the main valve 55 in accordance with delivered pressure, that is, pressure delivered to the load 59.

This ultimately delivered pressure will be different for each particular setting of the motor positioner 27 and will, of course, be relatively low for the first position shown for the arm 30 thereof. After the lapse of a given interval of time as determined by internal mechanism of the positioner 27, the positioner 27 will be automatically effective to project its actuating stem 32 downwardly by a relatively small increment, thereby increasing the load on spring 62 and determining a correspondingly higher ultimate delivered pressure to the load. With this projection of the positioner stem, the indicator 30 may be advanced to the second step opposite the mark 31.

After a further lapse of time as determined by appropriate settings within the positioner 27, the positioner stem will be automatically further depressed so as to again raise the regulating point of the system by a predetermined incremental amount. The process will be automatically repeated for each motor-controlled advance of the positioner 27 until such time as the full-load operating point is reached. For most satisfactory operation, it will be understood that the number of incremental advances provided by the positioner 27 should be adequate for the load system to be supplied by the regulating means; in other words, each increase in regulated pressure (for each biasing increment determined by the positioner 27) is preferably an increment that can be smoothly handled by the system.

The construction of Fig. 2 generally resembles that of Fig. 1, and corresponding parts have therefore been given the same reference numbers. In Fig. 2, however, the first pilot 56' is a differential-pressure pilot and has been employed to limit a given regulating point for the main valve 55, in accordance with the rate of flow of steam passing the throttling means 58. Thus, the high-pressure side of the actuating means for pilot valve 56 may be connected by line 60 to a point intermediate the main valve 55 and the throttling means 58, and the low-pressure side thereof may be connected by line 63 to the downstream side of the throttling means 58.

It will be appreciated that I have described relatively simple means for establishing the safe and progressive pressurizing of a load, particularly of a large load located remotely from a high-pressure steam supply system. The incremental build-up of steam pressure in the system may be governed purely by timing means or purely by the actual delivered pressure, or differentially by both.

While I have described my invention in detail for the preferred forms shown, it will be understood that modifications may be made within the scope of the invention as defined by the following claims.

I claim:

1. In a pressure-regulating system of the character indicated, a main valve including pressure-responsive actuating means therefore, regulating means for said main valve and including a control-pressure-fluid supply line connected to said actuating means, said pressure-fluid supply line including two pressure-responsive pilot valves having pilot-valve members in independent flow-controlling relation with said line, a delivery line connected to the outlet of said main valve and including throttling means downstream from said main valve, a first actuating-pressure connection for one of said pilot valves and connected to said delivery line at a location intermediate said main valve and said throttling means, and a second actuating-pressure connection for the other of said pilot valves and connected to said delivery line at a location downstream from said throttling means, said one pilot valve being a safety pilot valve and said other pilot valve being a regulating pilot valve, said safety pilot valve being operative on the occurrence of an undesirably high transient to control the pressure in said pressure-fluid supply line in a sense determining closure of said main valve, the range of operating control pressures for said regulating pilot valve including pressures at least no greater than the threshold pressure sensed by said first connection for actuation of said safety pilot valve.

2. A system according to claim 1, in which automatic preloading means are connected in variable biasing relation with said regulating pilot valve for biasing the operating point of said regulating means in a sequence of biasing increments.

3. In a pressure-regulating system of the character indicated, a main valve including pressure-responsive actuating means therefor, regulating means for said main valve and including a control-pressure-fluid supply line connected to said actuating means, said pressure-fluid supply line including safety and regulating pressure-responsive pilot valves having pilot-valve members in independent flow-controlling relation with said line, a delivery line connected to the outlet of said main valve and including throttling means downstream from said main valve, said safety pilot valve being differentially responsive and including separate control connections to said delivery line on opposite sides of said throttling means, and said regulating pilot valve being connected to said delivery line at a location on the downstream side of said throttling means, said safety pilot valve being operative on the occurrence of an undesirably high transient to control the pressure in said pressure-fluid supply line in a sense determining closure of said main valve, the range of operating control pressure for said regulating pilot valve including pressures at least no greater than the actuating differential-pressure threshold for actuation of said safety pilot valve.

4. In a pressure-regulating system of the character indicated, a main valve including pressure-responsive actuating means therefor, regulating means for said main valve and including a control-pressure-fluid supply line connecting the high-pressure side of said main valve to said actuating means, said pressure-fluid supply line including safety and regulating pressure-responsive pilot valves having pilot-valve members in independent flow-controlling relation with said line, a delivery line connected to the outlet of said main valve and including throttling means downstream from said main valve, a first actuating-pressure connection for said safety pilot valve and connected to said delivery line at a location intermediate said main valve and said throttling means, and a second actuating-pressure connection for said regulating pilot valve and connected to said delivery line at a location downstream from said throttling means, said safety pilot valve being operative on the occurrence of an undesirably high transient to control the pressure in said pressure-fluid supply line in a sense determining closure of said main valve, the range of operating control pressures for said regulating pilot valve including pressures at least no greater than the threshold pressure sensed by said first connection for actuation of said safety pilot valve.

5. In a pressure-regulating system of the character indicated, a main valve including pressure-responsive actuating means therefor, regulating means for said main valve and including a control-pressure-fluid supply line connected to said actuating means, said pressure-fluid supply line including safety and regulating pressure-responsive pilot valves having pilot-valve members in independent flow-controlling relation with said line, a delivery line connected to the outlet of said main valve and including throttling means downstream from said main valve, actuating-pressure connections for said pilot valves and connected to said delivery line downstream from said main valve and at locations on opposite sides of said throttling means, and automatic preloading means in variable biasing relation with said regulating pilot valve for biasing the operating point of said regulating means in a sequence of biasing increments, said safety pilot valve being operative on the occurrence of an undesirably high transient to control the pressure in said pressure-fluid supply line in a sense determining closure of said main valve, the range of operating control pressures for said regulating pilot valve including pressures at least no greater than the threshold pressure sensed by said first connection for actuation of said safety pilot valve.

6. In a pressure-regulating system of the character indicated, a main valve including pressure-responsive actuating means therefor, regulating means for said main valve and including a control-pressure-fluid supply line connected to said actuating means, said pressure-fluid supply line including safety and regulating pressure-responsive pilot valves having pilot-valve members in independent flow-controlling relation with said line, a delivery line connected to the outlet of said main valve and including throttling means downstream from said main valve, a load connected to said delivery line at a location downstream from said throttling means, a first actuating pressure connection for said safety pilot valve and connected to said delivery line on the main-valve side of said throttling means, and a second actuating pressure connection for said regulating pilot valve and connected to a part of said delivery line on the load side of said throttling means, said safety pilot valve being operative on the occurrence of an undesirably high transient to control the pressure in said pressure-fluid supply line in a sense determining closure of said main valve, the range of operating control pressures for said regulating pilot valve including pressures at least no greater than the threshold pressure sensed by said first connection for actuation of said safety pilot valve.

References Cited in the file of this patent
UNITED STATES PATENTS

| | | |
|---|---|---|
| 193,515 | Isbell | July 24, 1877 |
| 1,701,865 | Soderberg | Feb. 12, 1929 |
| 2,067,510 | Spence | Jan. 12, 1937 |
| 2,291,731 | Lake | Aug. 4, 1942 |
| 2,323,839 | Nixon | July 6, 1943 |
| 2,635,636 | Carson | Apr. 21, 1953 |
| 2,707,970 | Hughes | May 10, 1955 |

FOREIGN PATENTS

| | | |
|---|---|---|
| 572,186 | Germany | of 1933 |